(12) United States Patent
Natanzon

(10) Patent No.: US 8,935,498 B1
(45) Date of Patent: Jan. 13, 2015

(54) SPLITTER BASED HOT MIGRATION

(75) Inventor: Assaf Natanzon, Ramat-Gan (IL)

(73) Assignee: EMC Corporation, Hopkinton, MA (US)

( * ) Notice: Subject to any disclaimer, the term of this patent is extended or adjusted under 35 U.S.C. 154(b) by 646 days.

(21) Appl. No.: 13/248,939

(22) Filed: Sep. 29, 2011

(51) Int. Cl.
*G06F 12/02* (2006.01)

(52) U.S. Cl.
USPC ........... 711/165; 711/161; 711/162; 707/655; 707/660; 714/6.1; 714/6.23

(58) Field of Classification Search
USPC .................. 711/165, 161, 162; 707/655, 660; 714/6.1, 6.23
See application file for complete search history.

(56) References Cited

U.S. PATENT DOCUMENTS

| | | | |
|---|---|---|---|
| 7,774,565 B2* | 8/2010 | Lewin et al. ................... | 711/162 |
| 7,849,361 B2* | 12/2010 | Ahal et al. ...................... | 714/15 |
| 8,060,713 B1* | 11/2011 | Natanzon ....................... | 711/162 |
| 8,271,447 B1* | 9/2012 | Natanzon et al. ............. | 707/660 |
| 8,332,687 B1* | 12/2012 | Natanzon et al. ............. | 714/6.3 |
| 8,335,771 B1* | 12/2012 | Natanzon et al. ............. | 707/684 |
| 8,380,885 B1* | 2/2013 | Natanzon ......................... | 710/5 |
| 8,392,680 B1* | 3/2013 | Natanzon et al. ............. | 711/162 |
| 8,429,362 B1* | 4/2013 | Natanzon et al. ............. | 711/162 |
| 8,433,869 B1* | 4/2013 | Natanzon et al. ............. | 711/162 |
| 8,452,931 B1* | 5/2013 | Rokade et al. ................ | 711/162 |
| 8,478,955 B1* | 7/2013 | Natanzon et al. ............. | 711/162 |
| 8,521,691 B1* | 8/2013 | Natanzon ....................... | 707/640 |
| 8,521,694 B1* | 8/2013 | Natanzon ....................... | 707/649 |
| 8,600,945 B1* | 12/2013 | Natanzon et al. ............. | 707/648 |
| 8,694,700 B1* | 4/2014 | Natanzon et al. ............... | 710/52 |
| 8,738,872 B2* | 5/2014 | Liu ................................ | 711/162 |
| 2007/0266053 A1* | 11/2007 | Ahal et al. .................... | 707/200 |

* cited by examiner

*Primary Examiner* — Stephen Elmore
(74) *Attorney, Agent, or Firm* — Krishnendu Gupta; Joseph D'Angelo

(57) ABSTRACT

A system, method, and computer program product for intercepting Input/Outputs (IOs) sent to a second storage medium in a storage array via a splitter in the storage array, redirecting read IOs to a first storage medium, and redirecting writes to the first storage medium and a Data Protection appliance.

18 Claims, 15 Drawing Sheets

SPLITTER BASED HOT MIGRATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A system, method, and computer program product for intercepting Input/Outputs (IOs) sent to a second storage medium in a storage array via a splitter in the storage array, redirecting read IOs to a first storage medium, and redirecting writes to the first storage medium and a Data Protection appliance.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
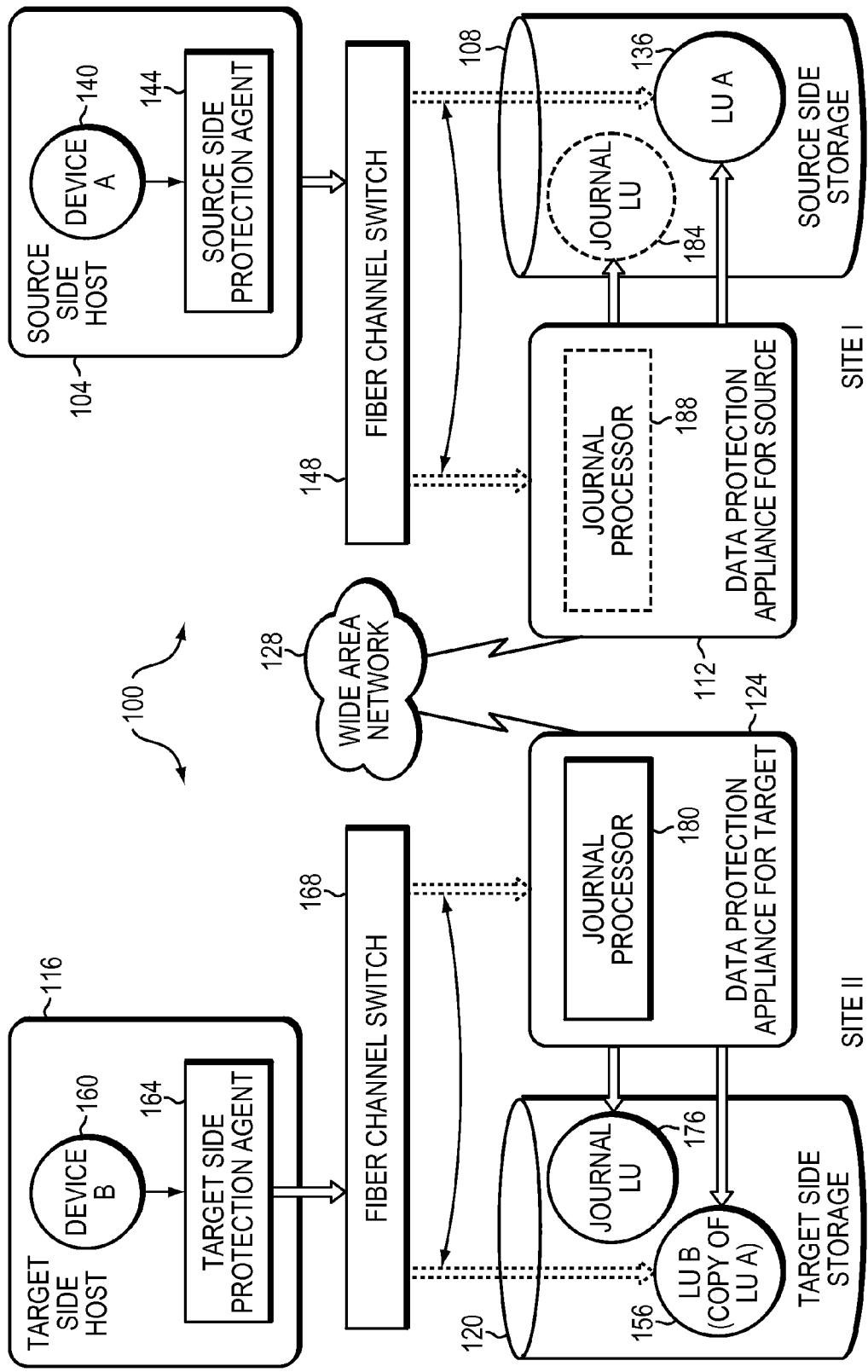
FIG. 1 is a simplified illustration of a data protection system, in accordance with an embodiment of the present disclosure.

Typically, migration from one storage array to another storage array requires an intelligent fabric or host base splitter to intercept the IOs. In an embodiment of the current disclosure, a replication splitter may be used to migrate data from any storage array, i.e. vendor and protocol agnostic, into another storage array. In some embodiments of the current disclosure, a user may configure a host to talk to a new array. In certain embodiments, a recovery appliance, such as EMC's recover point, may be configured to pull data from the old storage array into the new storage array. In further embodiments, the IO may be intercepted and split as received from the host. In at least some embodiments, the IO may be sent to the recovery appliance. In most embodiments, the IO may be sent to the old volume. The replication appliance may replicate the old volume into the new volume. In some embodiments, when all data arrives at new volume, the splitter may seamlessly change the replication direction and start replicating from the new volume to the old array.

The following definitions are employed throughout the specification and claims.

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system;

RPA—may be replication protection appliance, is another name for DPA.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO.

VIRTUAL VOLUME: may be a volume which is exposed to host by a virtualization layer, the virtual volume may be spanned across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. Pat. No. 8,725,691 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
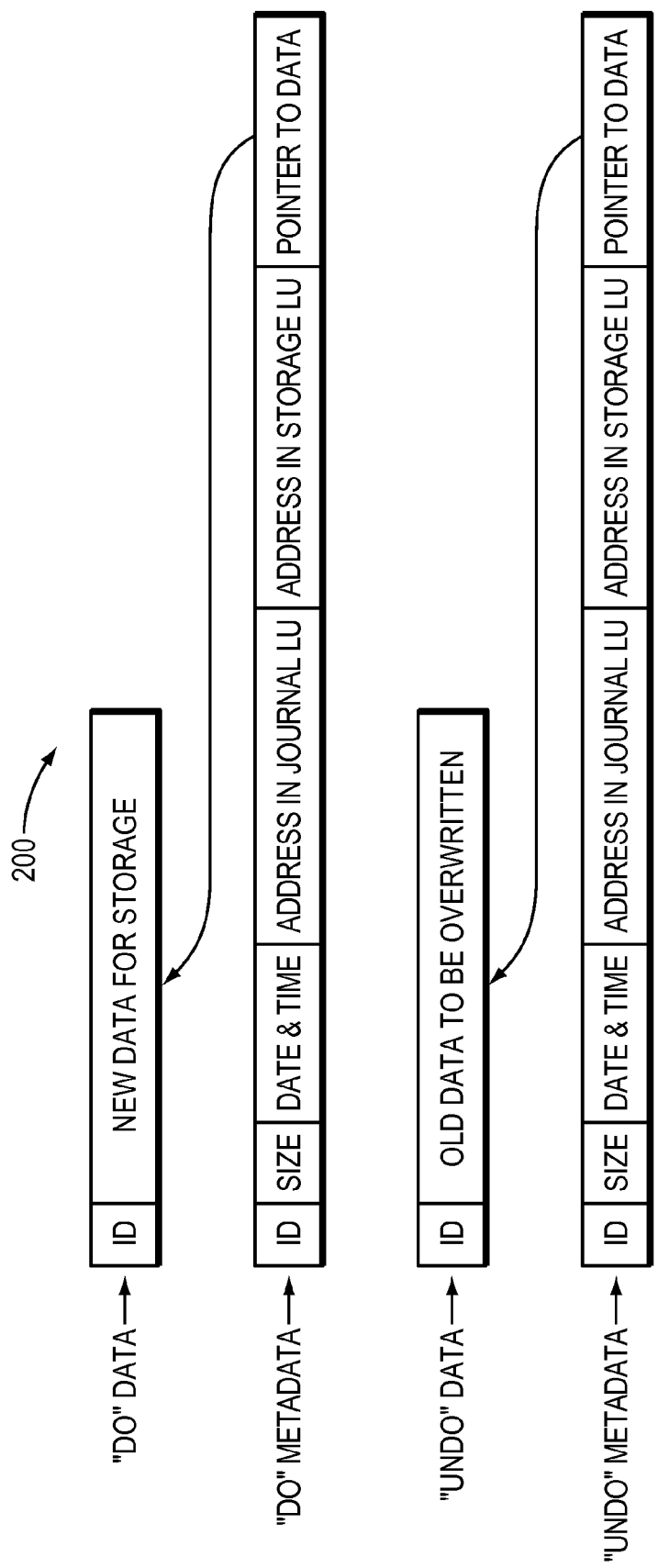
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g., DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replication site to the replica.

Splitting IO

Figure 3:
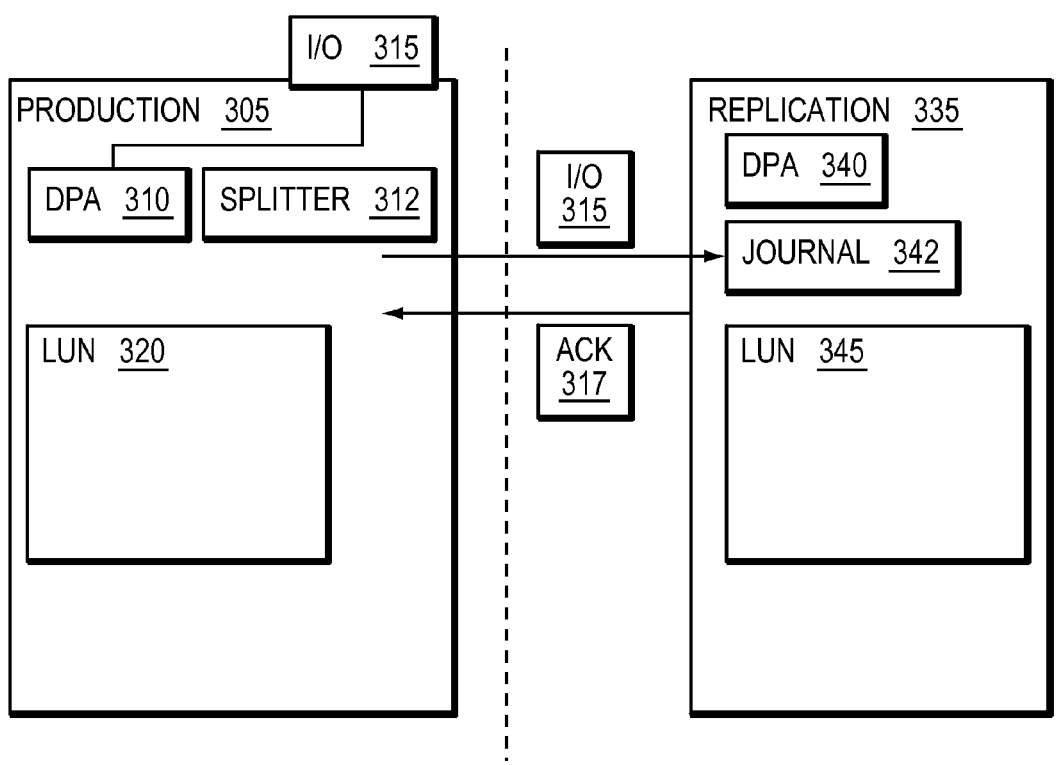
FIG. 3 is a simplified illustration of a production and replication site, in accordance with an embodiment of the present disclosure.
Figure 4:
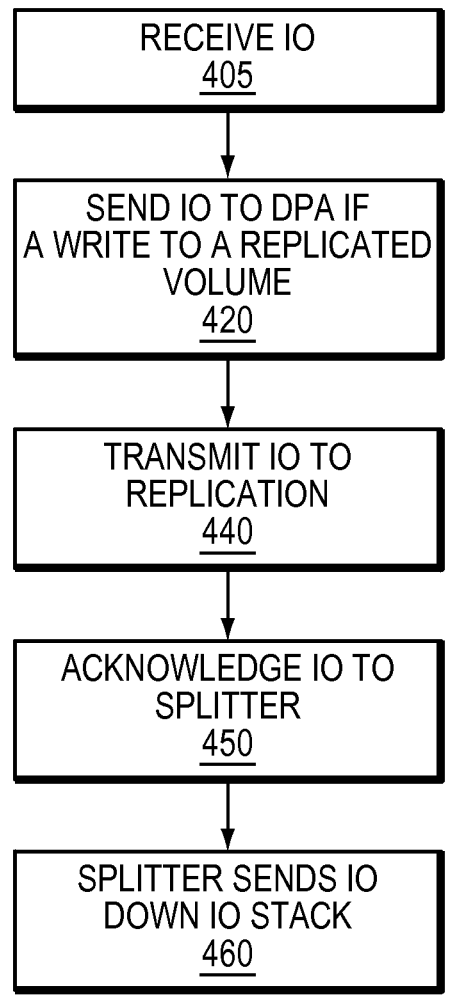
FIG. 4 is a simplified method of acknowledging a split TO, in accordance with an embodiment of the present disclosure.

Refer now to the example embodiment of FIGS. 3 and 4 which illustrate how IOs may be split at a production site, replicated, and sent to a replication site. An IO 315 is received at splitter 312 on production site 305 (step 405). If IO is a write to a volume being replicated, Splitter 312 sends IO to DPA 310 (step 420). DPA 310 may transmit IO 315 to replication site 335 (step 440). DPA 310 may acknowledge the IO to Splitter 312 (step 450). Splitter 312 may send IO 315 down the IO stack (Step 460).

Thus, in most embodiments, the replication site may have the changes applied to the production site stored in a journal on the replication site.

Array Migration

Generally, a user may occasionally desire to change a first or old storage array to a second or new storage array. Typically, this upgrade may require freezing data being written to the old storage array or stopping the production site, copying data from the old storage array to a new storage array, and then restarting the production site or allowing the data to be written again to the new storage array. Conventionally, stopping a production site or freezing data being written to a storage array requires significant down time.

Another typical method to enable such a change may require replicating the data from the first array to the second array and then failing over from the first array to the second array. Usually, however, if the old array comes from a different vendor than the new array, heterogeneous replication may be required which is usually complex to deploy.

In an embodiment of the current disclosure, a new storage array is enabled to be swapped with an old storage array without stopping the production site or freezing data being written to the old array. In certain embodiments, the new storage array may be used with the old storage array while data may be asynchronously pulled from the old storage array to the new storage array.

In certain embodiment of the current disclosure, a splitter in the new storage array may be configured to pull data from devices or storage components in the old storage array to devices or storage components in the new storage array. In some embodiments, applications may be configured to use the new storage array and the storage device or devices on the new storage array. In at least some embodiments, a Data Protection Appliance may be configured to pull data from the old storage array to the new storage array while data production continues.

In most embodiments, an IO splitter in the new storage array may intercept a write IO, create a copy of the IO, send the copy of an IO to a DPA and send the IO to the old storage array device, the IO splitter may also intercept a read IO sent to the new array forward the read to the old array, and may reply to the read. In some embodiments of the current techniques, the splitter may be applied to enable migration from an old storage device to a new storage device. In certain embodiments, the migration may enable the new device to synch with and mirror the old device, without interruption of the IO sent to the new device or the old device. In some embodiments, upon synchronization with the old device, the new device may be used for IO and the old device may be disconnected.

Figure 5:
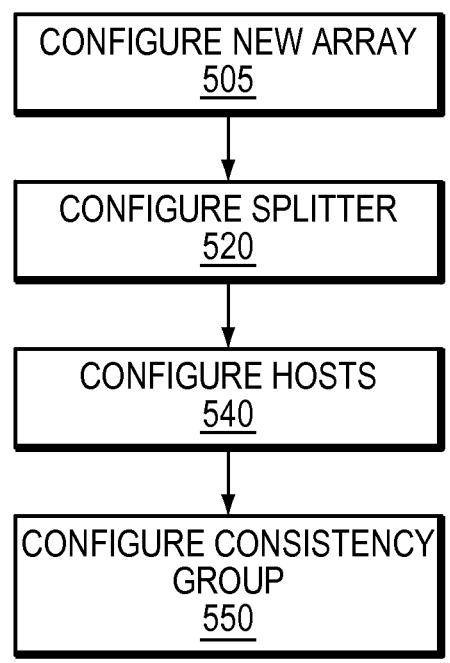
FIG. 5 is a simplified method of configuring a new array, in accordance with an embodiment of the present disclosure.
Figure 6:
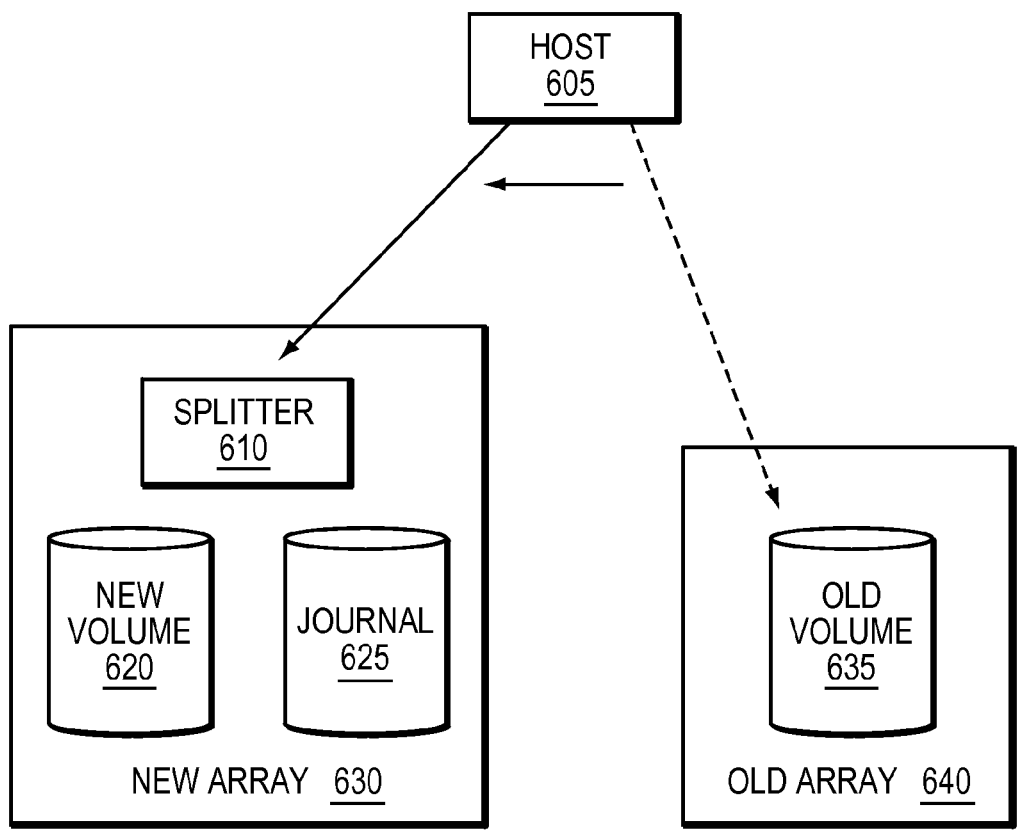
FIG. 6 is a simplified illustration of a host, new array, and old array, in accordance with an embodiment of the present disclosure.

Refer now the example embodiments of FIGS. 5 and 6. A user configures new volume 620 in array 630 (step 505). A user configures splitter 610 to split IOs arriving to volume 620 into volume 635 (step 520) enabling IO arriving to volume 620 to be sent to volume 635 instead. A user than configures hosts to use new volume 620 (step 540). A user configures a consistency group to migrate the data from volume 635 to volume 620 (step 550)

Initialization

Figure 7:
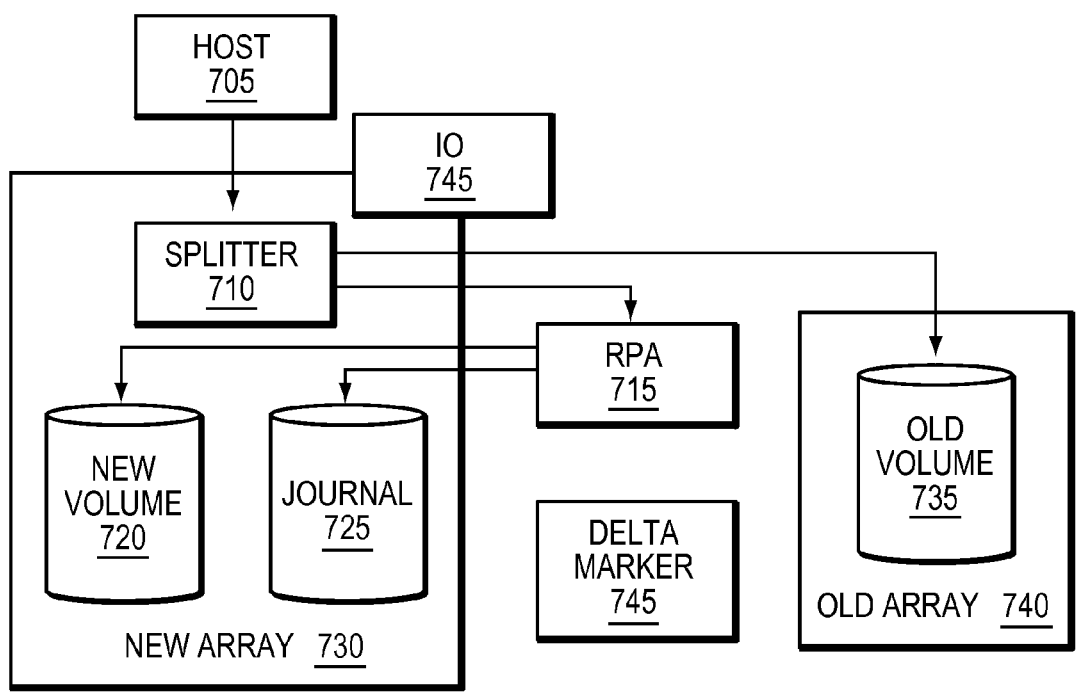
FIG. 7 is a simplified method of migrating data from an old array to a new array, in accordance with an embodiment of the present disclosure.

Refer now to the example embodiments of FIG. 7. In the example embodiment of FIG. 7, host 705 is configured to communicate IO to volume 720, instead of volume 735. Splitter 710 is configured to split IO to RPA 715 and send a copy of IO to old volume 735 located on old array 740. In this configuration the splitter may redirect all read commands to old storage array 740 and may split write commands to both data protection appliance 715 and old volume 735. RPA 715 is configured to replicate old volume 735 to new volume 720 using journal 725 on new array 730.

Figure 8:
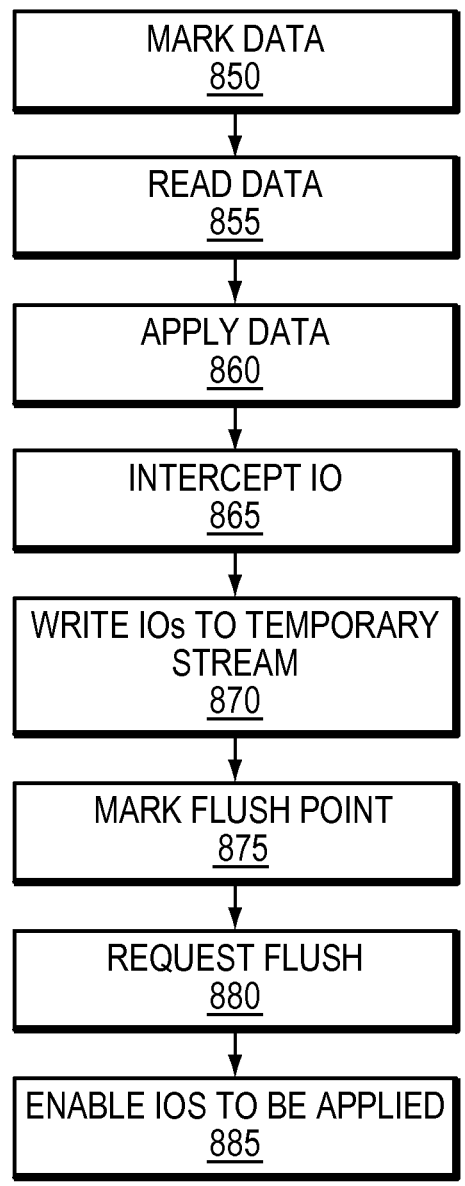
FIG. 8 is a simplified illustration of migrating data from an old array to a new array while actively accessing the data in the arrays, in accordance with an embodiment of the present disclosure.

Refer now to the example embodiment of FIGS. 7 and 8, which present a sample initialization procedure. In this embodiment, when new volume 720 is synchronized, volume 720 may be marked as dirty in the delta marker (step 850). In this embodiment, the ping pong initialization process reads the locations marked as dirty from the production volume 735 (step 855) and sends them to the replica volume 720. IOs arriving from the ping pong process are written to volume 720 (step 860), during the initialization process, new IOs continue to arrive to volume 720 from host 705, the splitter 710 intercepts the new IOs (865), read commands are just redirected to old volume 735, while write commands are sent both to DPA 715 and to old volume 735, DPA 715 write the IOs which arrived from splitter 710 into a temporary stream in journal 725 (870).

Periodically DPA 715 marks a point P in the temporary journal stream (step 875). DPA 715 requests splitter 710 flush open IOs (step 880). Splitter 710 returns IOs that are flushed when IOs which are open during the flush request are completed (for example all IOs which were open during the flush request may have completed successfully to both DPA 715 and old volume 735). Once the IOs are flushed DPA 715 may apply IOs from temporary stream in journal 725 to new volume 720 (step 885). Once initialization process completes, temporary stream may be appended to the end of the do stream (which may be empty) new IOs may arrive to do stream, the system may behave as described in the 5 phase distribution section.

Figure 9:
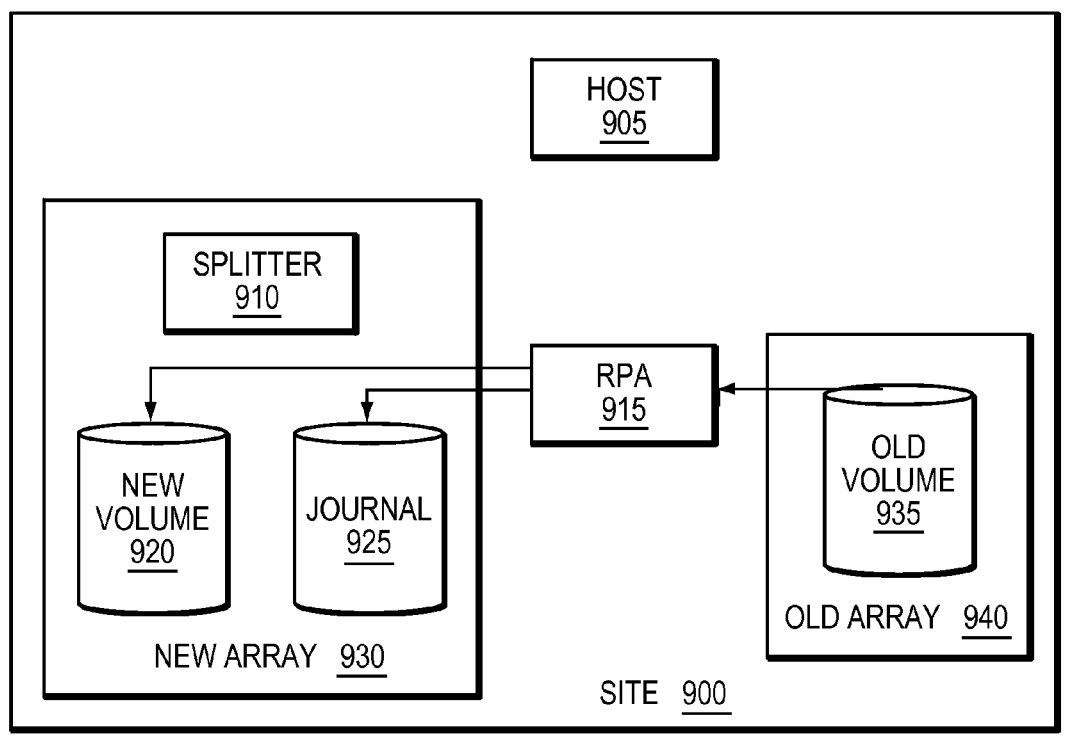
FIG. 9 is a simplified illustration of an old array and a new array at a site, in accordance with an embodiment of the present disclosure.
Figure 10:
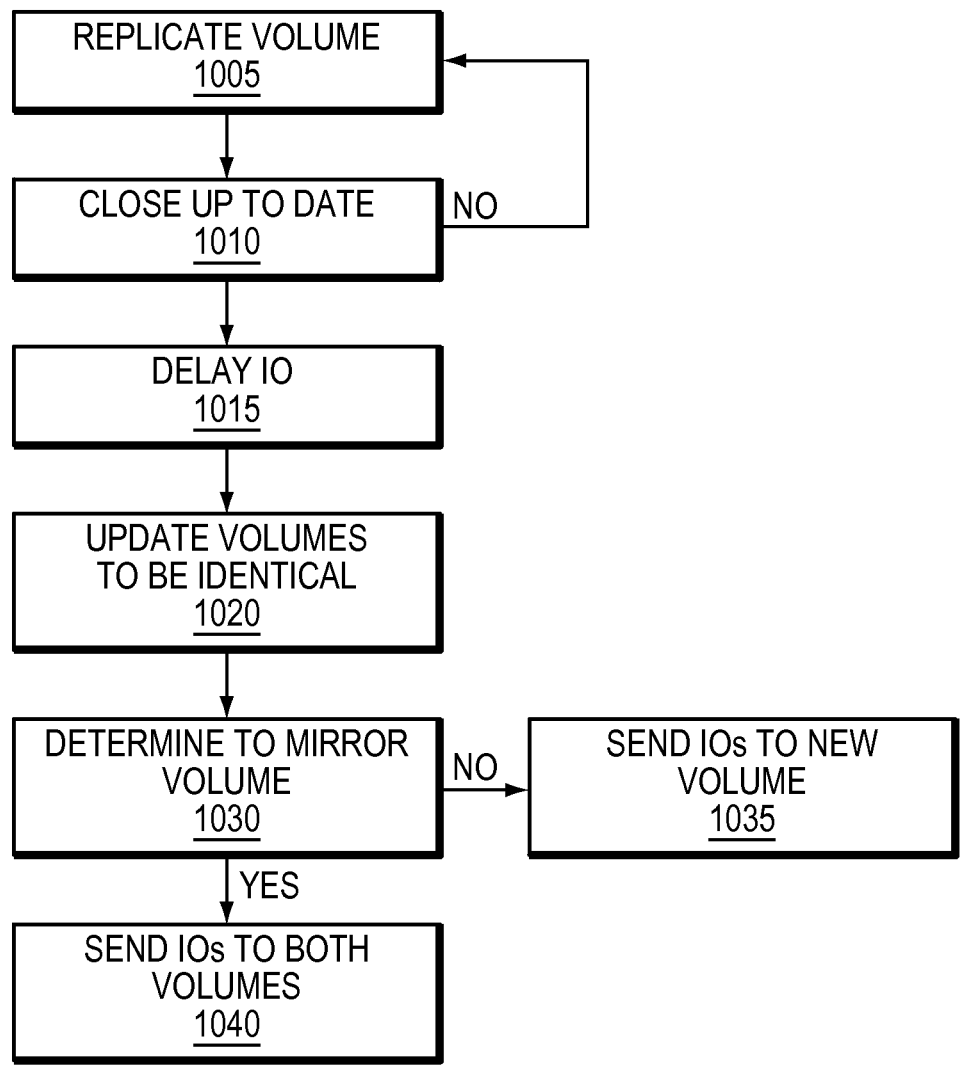
FIG. 10 is a further alternative simplified method of migrating data from an old array to a new array, in accordance with an embodiment of the present disclosure.

Refer now to the example embodiments of FIGS. 9 and 10. In the example embodiments, RPA 915 is replicating old volume 935 to new volume 920 (step 1005). The replication of old volume 935 to volume 920 may occur in the background while new IO is being sent from host 905. In most embodiments, once the data from old volume has been synchronized, (i.e. no more data needs to be read from old volume and new volume and the journal include the data that arrived to old volume), the system may begin to start reducing the journal lag, as described here.

A determination is made whether the volumes 920, 935 are close to being up to date (step 1010). For example, in some embodiments this may be determined by comparing the size of the do stream plus the size of the data cached in the DPA that has not yet been written to a limit. If the volumes are not close to being synchronized, replication continues (step 1005), and a lag reduction mechanism as described herein may be applied. If the volumes, 920, 935 are close to up to date, write IOs from host 905 are delayed by the splitter (step 1015). Volumes 920, 935, are updated until volumes 920, 935 are identical (step 1020), all data from do stream is applied to volume 920, all IOs cached in DPA cache are also flushed to volume 920, and journal is discarded. Once volumes are synchronized reads may be served from the new volume.

In most embodiments, once the volumes are synchronized a determination may be made whether or not to mirror the volume 920 (step 1030). If volumes 920, 935 are to be mirrored IO is sent to both volumes (step 1040). If the volumes are not to be mirrored, IOs are sent to volume 920 (step 1035). If the volumes are not to be mirrored, volume 935 may be transparently removed from the system. Once Volumes are in sync write are no longer sent to the DPA, and the consistency group may be automatically removed from the system.

Lag Reduction

Figure 11:
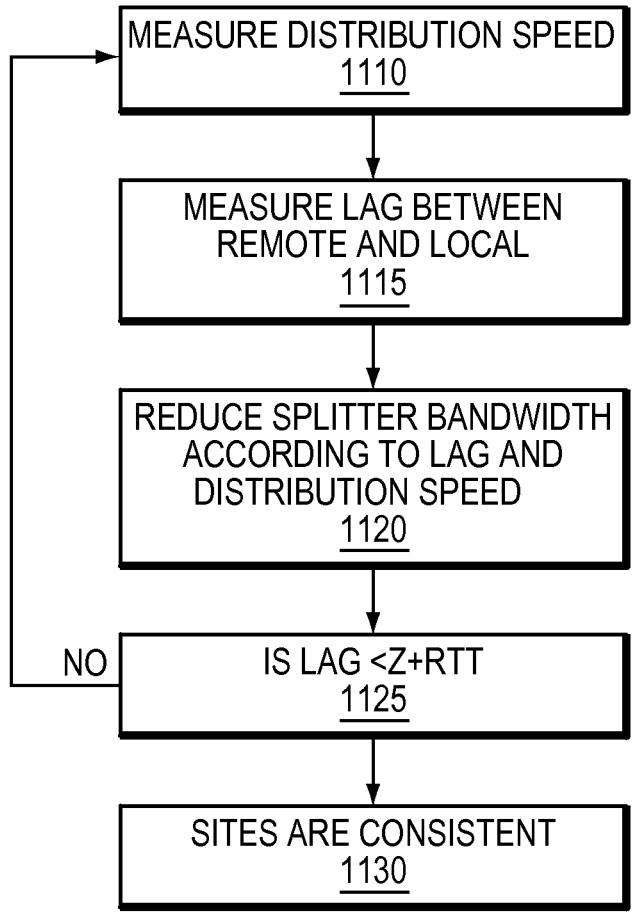
FIG. 11 is a simplified method of reducing lag between a new array and an old array, in accordance with an embodiment of the present disclosure.

In the example embodiments of FIGS. 9 and 11, the system may try to reduce the lag between volume 935 and volume 920. In certain embodiments, the system may start reducing the Lag between the old volume and the new volume, i.e. reduce the size of the do stream and the data in the cache of the DPA. In these embodiments, speed of distributing data from the do stream to the new volume may be measured periodically (step 1110). In some of these embodiments, the size of the do stream may be evaluated, the IO from the host may limit the speed to be a percentage, i.e. 70%, of the distribution speed. The lag between the volumes may be measured (step 1115). The splitter bandwidth may be reduced according to lag and distribution speed (step 1120). A determination is made if the size of the do stream+the amount of data in the cache of the DPA is less than an amount, for example, 50 MB. If the lag is less than a certain amount, the sites may be made identical (step 1125). In certain embodiments, if the lag is not within a specified amount, the process may be repeated.

Splitter Mirror

Figure 12:
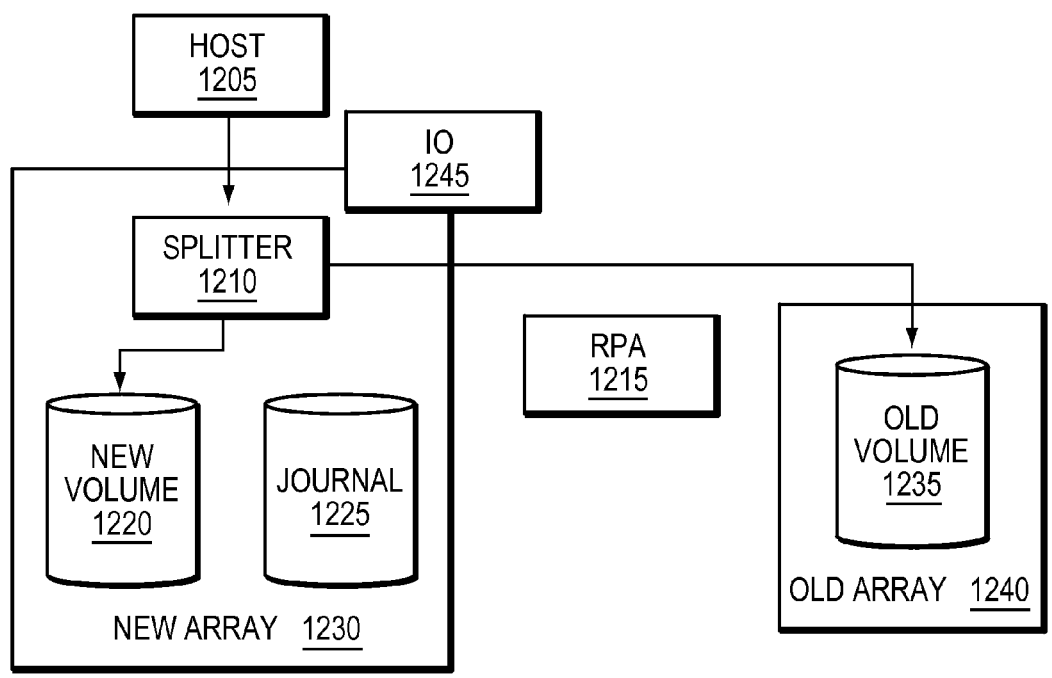
FIG. 12 is an alternative simplified illustration of an old array and a new array at a site, in accordance with an embodiment of the present disclosure.
Figure 13:
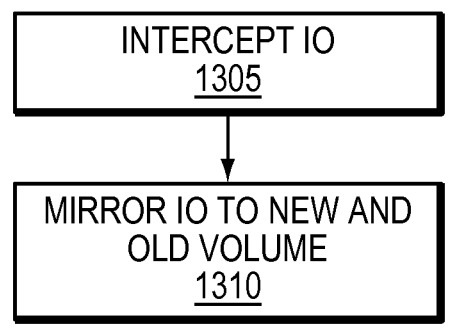
FIG. 13 is a simplified method of mirroring data between a new and old volume, in accordance with an embodiment of the present disclosure.

Refer now to the example embodiments of FIGS. 12 and 13. In the example embodiments of FIGS. 12 and 13, host 1205 may send write IO 1245 to new array 1230. Splitter 1210 may intercept the IO 1245 (step 1305). Splitter 1210 may mirror IO 1245 to new volume 1220 and old volume 1235. In FIG. 12, new array 1220 and old array 1235 are kept consistent. Thus, in this embodiment, old array 1235 may be removed without impacting host 1205 and new volume 1220. In some embodiments, when the volumes are being mirrored, the splitter may track the changes to the volume in a bit map. In certain embodiments, replication may start from the new volume to the old volume using a DPA and a journal or another journal at the old storage array. In other embodiments, during mirroring of the volumes, IOs may not be sent to a DPA and the journal may become obsolete.

Figure 14:
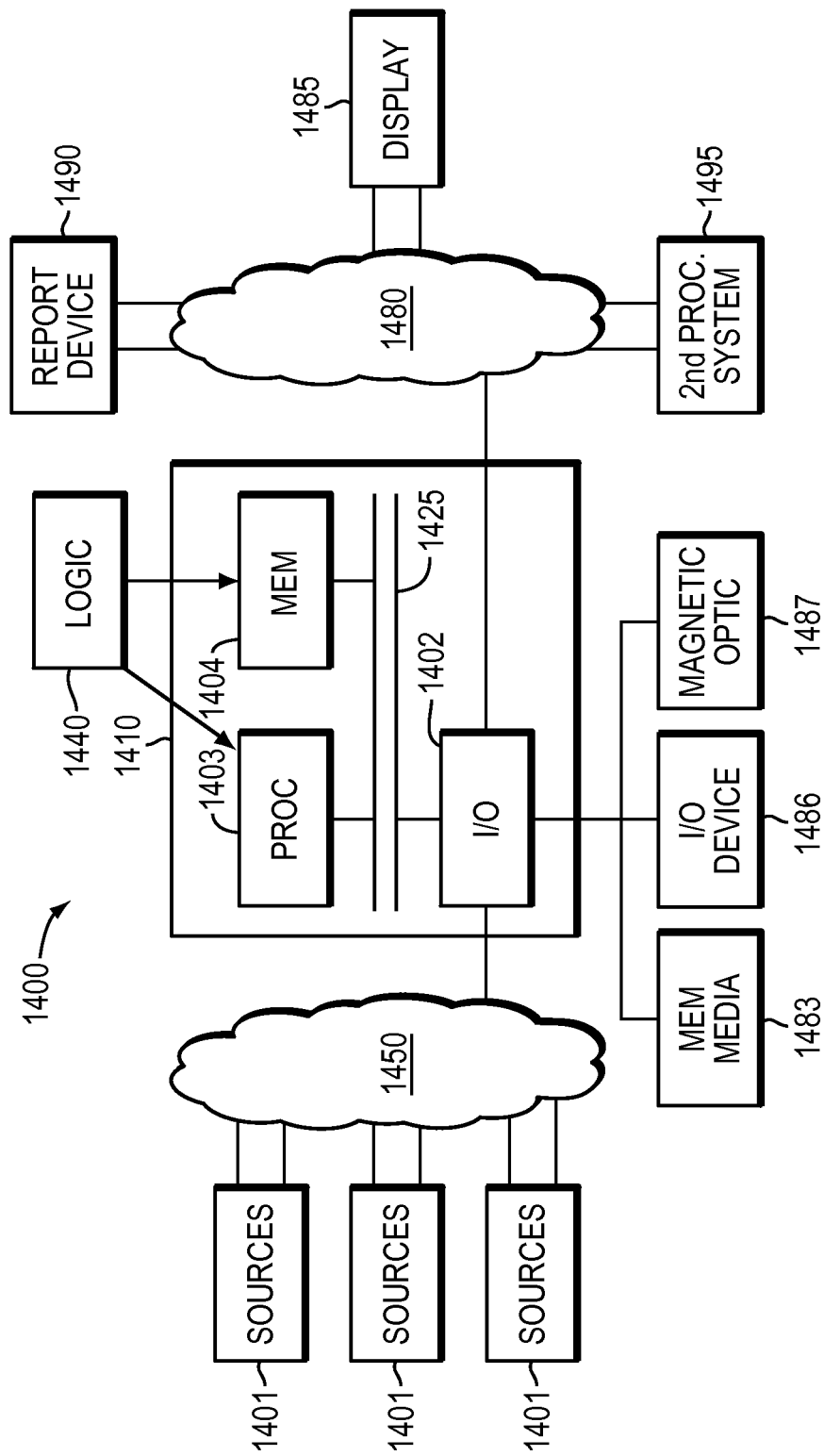
FIG. 14 is an example of an embodiment of an apparatus that may utilize the techniques described herein, in accordance with an embodiment of the present disclosure.
Figure 15:
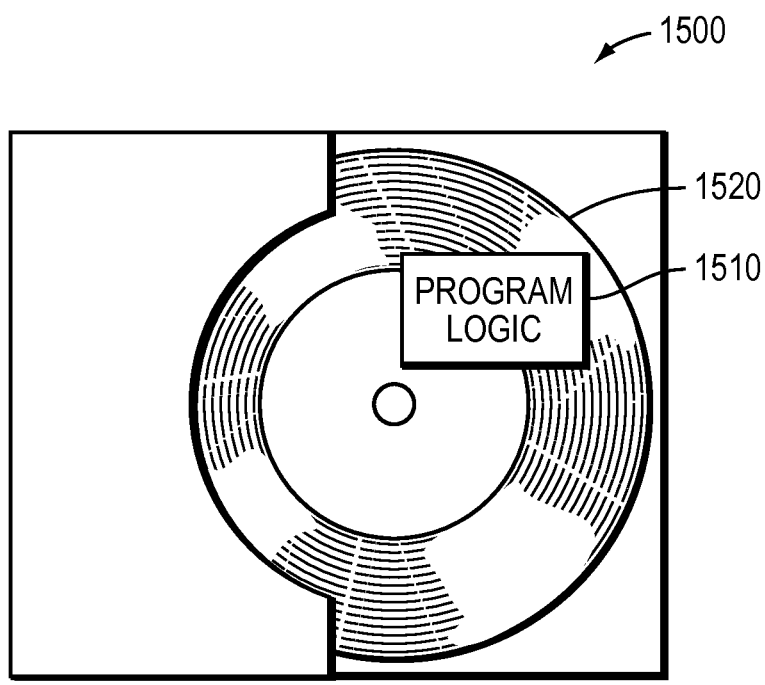
FIG. 15 is an example of an embodiment of a method embodied on a computer readable storage medium that may utilize the techniques described herein, in accordance with an embodiment of the present invention.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 15 shows Program Logic 1510 embodied on a computer-readable medium 1530 as shown, and wherein the Logic is encoded in computer-executable code configured for carrying out the reservation service process of this invention and thereby forming a Computer Program Product 1500. Logic 1440 of FIG. 14 may be loaded into memory 904 and executed by processor 1430. Logic 1440 may also be the same logic 1510 on computer readable medium 1530. Logic 1440 may also be executed on one or more virtual machines and or processors.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for data migration, the system comprising:
a splitter;
a data protection appliance (DPA)
a journal;
a first storage medium;
a storage array having a second storage medium and a splitter; and
  computer-executable logic operating in memory, wherein the computer-executable program logic is configured for execution of:
intercepting Input/Outputs (IOs) to the second storage medium at the splitter;
redirecting read IOs to the first storage medium; and
redirecting writes to the first storage medium and the DPA.

2. The system of claim 1 wherein the computer executable logic is further configured for the execution of:
configuring a host to write data to the second storage medium; and
copying the data from the first storage medium to the second storage medium while the second storage medium is enabled to actively receive Input/Output (IO).

3. The system of claim 2 wherein the computer executable logic is further configured for the execution of:
reducing lag between the first storage medium and the second storage medium; wherein the lag corresponds to the data to be copied from the first storage medium to the second storage medium.

4. The system of claim 3 wherein the computer executable logic is further configured for the execution of:
determining whether to use the first storage medium as a mirror for the second storage medium.

5. The system of claim 3 wherein the computer executable logic is further configured for the execution of:
creating a notification when all of the data on the first storage medium is copies to the second storage medium.

6. The system of claim 3 wherein the computer executable logic is further configured for the execution of:
changing direction of the replication between the first and second storage mediums.

7. A computer implemented method for data replication, the method comprising:
intercepting Input/Outputs (IOs) sent to a second storage medium in a storage array via a splitter in the storage array; wherein the storage medium is mapped to a physical storage medium enabled to store data;
redirecting read IOs to a first storage medium; and
redirecting writes to the first storage medium and a Data Protection appliance.

8. The computer implemented method of claim 7 wherein the method further comprising:
configuring a host to write data to the second storage medium; and
copying the data from the first storage medium to the second storage medium while the second storage medium is enabled to actively receive Input/Outputs (IO).

9. The computer implemented method of claim 8 wherein the method further comprising:
reducing lag between the first storage medium and the second storage medium; wherein the lag corresponds to the data to be copied from the first storage medium to the second storage medium.

10. The computer implemented method of claim 9 wherein the method further comprising:
determining whether to use the first storage medium as a mirror for the second storage medium.

11. The computer implemented method of claim 9 wherein the method further comprising:
creating a notification when all of the data on the first storage medium is copied to the second storage medium.

12. The computer implemented method of claim 9 wherein the method further comprising:
changing direction of the replication between the first and second storage mediums.

13. A computer program product for use in replication comprising:
a non-transitory computer readable medium encoded with computer executable program code for migration of data, the code configured to enable the execution of:
intercepting Input/Outputs (IOs) sent to a second storage medium in a storage array via a splitter in the storage array;
redirecting read IOs to a first storage medium; and
redirecting writes to the first storage medium and a Data Protection appliance.

14. The program product of claim 13 wherein the executable program code is further configured for execution of:
configuring a host to write data to the second storage medium; and
copying the data from the first storage medium to the second storage medium while the second storage medium is enabled to actively receive Input/Outputs (IO).

15. The program product of claim 13 wherein the executable program code is further configured for execution of:
reducing the lag between the first storage medium and the second storage medium; wherein the lag corresponds to the data to be copied from the first storage medium to the second storage medium.

16. The program product of claim 13 wherein the executable program code is further configured for execution of:
determining whether to use the first storage medium as a mirror for the second storage medium.

17. The program product of claim 13 wherein the executable program code is further configured for execution of:
creating a notification when all of the data on the first storage medium is copied to the second storage medium.

18. The program product of claim 13 wherein the executable program code is further configured for execution of:
changing direction of the replication between the first and second storage mediums.

* * * * *